United States Patent
Chandrasekhar et al.

(10) Patent No.: US 8,514,738 B2
(45) Date of Patent: Aug. 20, 2013

(54) PHYSICAL DOWNLINK SHARED CHANNEL MUTING ON CELL-SPECIFIC REFERENCE SYMBOLS LOCATIONS FOR OF NON-SERVING CELLS

(75) Inventors: Vikram Chandrasekhar, Dallas, TX (US); Eko N. Onggosanusi, Allen, TX (US); Anthony Ekpenyong, Farmers Branch, TX (US); Runhua Chen, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 338 days.

(21) Appl. No.: 13/075,854

(22) Filed: Mar. 30, 2011

(65) Prior Publication Data

US 2011/0243009 A1 Oct. 6, 2011

Related U.S. Application Data

(60) Provisional application No. 61/320,217, filed on Apr. 1, 2010, provisional application No. 61/320,900, filed on Apr. 5, 2010, provisional application No. 61/367,694, filed on Jul. 26, 2010.

(51) Int. Cl.
*H04L 12/58* (2006.01)

(52) U.S. Cl.
USPC .............................. 370/252; 370/329; 455/450

(58) Field of Classification Search
USPC .......................... 370/328, 329, 252; 455/450
See application file for complete search history.

(56) References Cited

U.S. PATENT DOCUMENTS

2011/0199986 A1* 8/2011 Fong et al. .................... 370/329
2012/0076106 A1* 3/2012 Bhattad et al. ............... 370/330

* cited by examiner

*Primary Examiner* — Hanh N Nguyen
*Assistant Examiner* — Hung S Nguyen
(74) *Attorney, Agent, or Firm* — Ronald O. Neerings; Wade James Brady, III; Frederick J. Telecky, Jr.

(57) ABSTRACT

The primary serving base station transmits PDSCH with zero energy on the inter-cell CRS resource element location. This is called mute PDSCH. Within the first Physical Resource Block (PRB 0), the RE positions in the frequency domain are indexed between 0 and 11. The muted PDSCH RE positions per antenna port are computed using the cell IDs of all CoMP cells other than the cell ID i. The invention defines the Orthogonal Frequency Division Multiplexing (OFDM) symbols in which muting occurs.

32 Claims, 11 Drawing Sheets

SIGNAL $S_1$ (FOUR BITS) : TO COMMUNICATE SUB-FRAME OFFSET WHEN PDSCH MUTING OCCURS

SIGNAL $S_2$ (TWO BITS) : TO COMMUNICATE DUTY CYCLE (TIME DOMAIN PERIODICITY)

PHYSICAL DOWNLINK SHARED CHANNEL MUTING ON CELL-SPECIFIC REFERENCE SYMBOLS LOCATIONS FOR OF NON-SERVING CELLS

CLAIM OF PRIORITY

This application claims priority under 35 U.S.C. 119(e) (1) to U.S. Provisional Application No. 61/320,217 filed Apr. 1, 2010, U.S. Provisional Application No. 61/320,900 filed Apr. 5, 2010 and U.S. Provisional Application No. 61/367,694 filed Jul. 26, 2010.

TECHNICAL FIELD OF THE INVENTION

The technical field of this invention is wireless communication such as wireless telephony.

BACKGROUND OF THE INVENTION

Future wireless telephone systems will use coordinated transmissions across multiple cells within each cell-site or across multiple cell site. This is called Coordinated Multipoint Reception (CoMP). CoMP operation enhances coverage to UEs hitherto experiencing poor coverage because they are served using just a single cell. UEs benefiting from CoMP are labeled advanced UEs.

CoMP operation requires accurate channel state information (CSI) knowledge at the advanced user equipment (UE). CSI refers to the multi-dimensional channel matrix between each coordinating cell (the CoMP cell) and the advanced UE.

Assume that the advanced UE has a single primary serving cell and N secondary cells which coordinate their transmissions. The coordinating cell set serving the advanced UE of interest are labeled {CoMP Cell$_0$, CoMP Cell$_1$, ..., CoMP Cell$_N$}. In a prior standard there were no coordinating cells so N=0.

SUMMARY OF THE INVENTION

The eNodeB, which is CoMP Cell 0 the principal serving cell, transmits Physical Downlink Shared Channel (PDSCH) with zero energy on a set of inter-cell CRS resource element locations. This is called PDSCH muting on inter-cell CRS pilot locations. Within the first Physical Resource Block (PRB 0), the Resource Element (RE) positions in the frequency domain are indexed between 0 and 11. The muted PDSCH RE positions per antenna port are computed using the cell IDs of all CoMP cells other than the cell ID i. The Orthogonal Frequency Division Multiplexing (OFDM) symbols in which muting occurs are further defined below.

Muting on inter-cell CRS pilot locations serves two purposes. It helps a UE served by CoMP cell 0 measure its CSI to a set of CoMP cell(s) j≠0. It helps CoMP cells j≠0 to lower their PDSCH interference on CRS positions of CoMP cell 0. These advantages enable the UE to measure its CSI to CoMP cell 0 more accurately.

Mathematically, the muted PDSCH RE positions per transmission antenna port within any resource block (RB) are given as:

$$M_y = \{6*k + [3*m_y + \text{CellID}(\text{CoMP Cell}_j) \text{modulo} 6]\} \text{modulo} 12$$

where: $M_y$ is the muted PDSCH RE at antenna port y; k is 0 or 1; y is 0 to 3; $m_y$ is 0 or 1; j=1, 2, ... N. The parameter k takes the values of either 0 or 1 for any transmission antenna port y. The values of $m_y$ for antenna port y depend on which OFDM symbol is configured for PDSCH muting. The relative positions of the muted PDSCH REs stay the same across different resource blocks within a given sub-frame.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
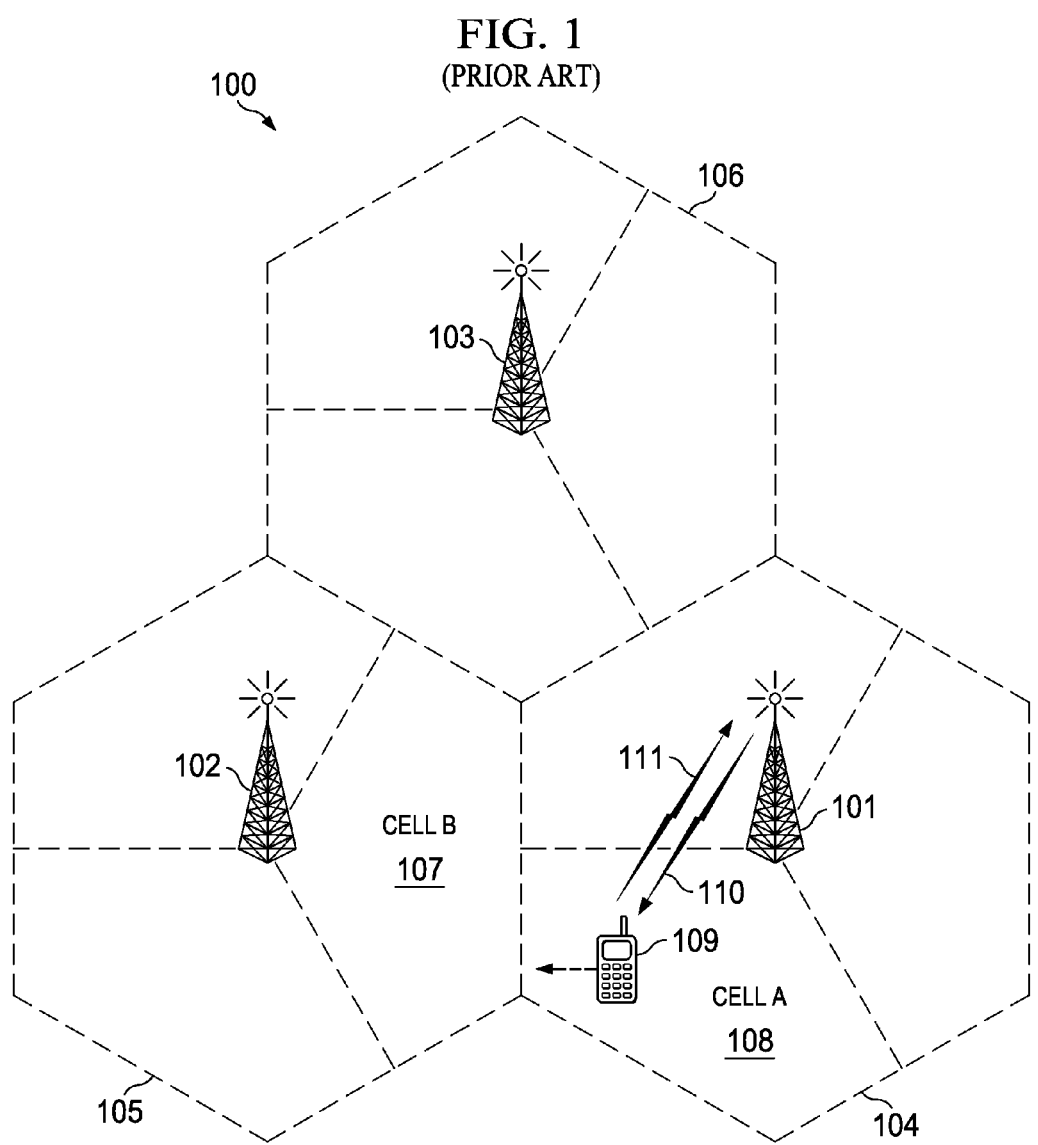
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Base stations 101, 102 and 103 (eNB) operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of uplink 111 time or frequency or code resources. If UE 109 has data ready for transmission, which may be traffic data, measurements report, tracking area update, UE 109 can transmit a random access signal on uplink 111. The random access signal notifies base station 101 that UE 109 requires uplink resources to transmit the UEs data. Base station 101 responds by transmitting to UE 109 via downlink (DL) 110, a message containing the parameters of the resources allocated for UE 109 uplink transmission along with a possible timing error correction. After receiving the resource allocation and a possible timing advance message transmitted on downlink (DL) 110 by base station 101, UE 109 optionally adjusts its transmit timing and transmits the data on uplink 111 employing the allotted resources during the prescribed time interval.

Base station 101 configures UE 109 for periodic uplink sounding reference signal (SRS) transmission. Base station 101 estimates uplink channel quality information (CSI) from the SRS transmission.

Figure 2:
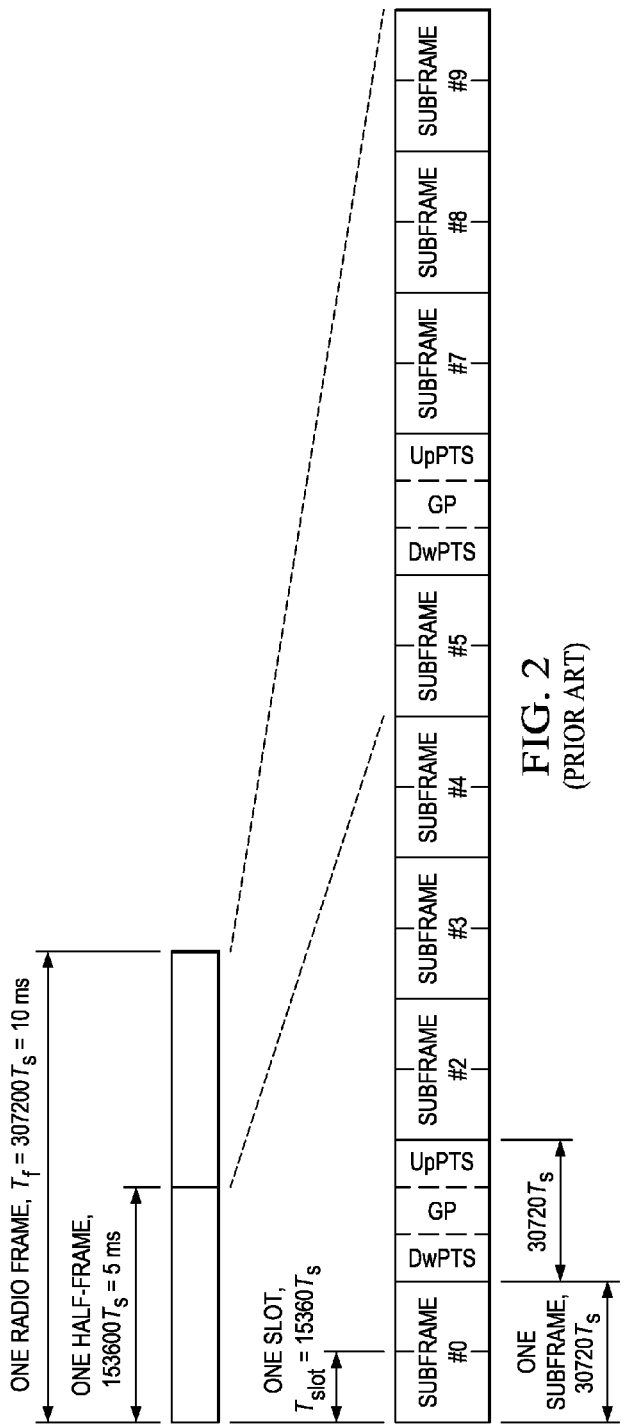
FIG. 2 shows the Evolved Universal Terrestrial Radio Access (E-UTRA) Time Division Duplex (TDD) frame structure of the prior art.

FIG. 2 shows the Evolved Universal Terrestrial Radio Access (E-UTRA) time division duplex (TDD) Frame Structure. Different sub-frames are allocated for downlink (DL) or uplink (UL) transmissions. Table 1 shows applicable DL/UL sub-frame allocations.

TABLE 1

| Configuration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Future wireless telephone systems will use coordinated transmissions across multiple cells within each cell-site or across multiple cell site. This is called Coordinated Multi-point Reception (CoMP). CoMP operation enhances coverage to UEs hitherto experiencing poor coverage because they are served using just a single cell. UEs benefiting from CoMP are labeled advanced UEs.

CoMP operation requires accurate channel state information (CSI) knowledge at the advanced UE. CSI is the multi-dimensional channel matrix between each coordinating cell (the CoMP cell) and the advanced UE. This invention employs PDSCH muting schemes over the cell-specific reference symbols (CRS) pilot locations of a set of non-serving cell(s). Muting on inter-cell CRS pilot locations serves two purposes. It helps a UE served by CoMP cell 0 measure its CSI to a set of CoMP cell(s) j≠0. It helps CoMP cells j≠0 to lower their PDSCH interference on CRS positions of CoMP cell 0. These advantages enable the UE to measure its CSI to CoMP cell 0 more accurately.

Assume that the advanced UE has a single primary serving cell and N secondary cells which coordinate their transmissions. The coordinating cell set serving the advanced UE of interest are labeled {CoMP Cell$_0$, CoMP Cell$_1$, ..., CoMP Cell$_N$}. In a prior standard there were no coordinating cells so N=0.

In the proposed standard the number of coordinating cells N cannot exceed 4. This limitation is enforced by the cell ID modulo 6 pattern for CRS. Without loss of generality, this application assumes two CoMP cells, thus N=2. In this application CoMP cell 0 refers to the principal serving cell of the advanced UE. This application assumes the advanced UE configured for CoMP operation has knowledge of the cell IDs of all N CoMP cells within the CoMP set.

The following are proposed Physical Downlink Shared Channel (PDSCH) Resource Element (RE) muting schemes to perform inter-cell CSI estimation at an advanced UE configured for CoMP reception.

In a first embodiment the eNodeB, which is CoMP Cell 0 the principal serving cell, transmits PDSCH with zero energy on a set of inter-cell CRS resource element locations. This is called PDSCH RE muting on inter-cell CRS pilot locations. Within the first Physical Resource Block (PRB 0), the RE positions in the frequency domain are indexed between 0 and 11. The muted PDSCH RE positions per antenna port are computed using the cell IDs of all CoMP cells other than the principal serving cell ID. The Orthogonal Frequency Division Multiplexing (OFDM) symbols in which muting occurs are further defined below.

Mathematically, the muted PDSCH RE positions per transmission antenna port are given as:

$$M_y = \{6*k + /3*m_y + \text{CellID}(\text{CoMP Cell}_j) \text{modulo} 6]\} \text{modulo} 12$$

where: $M_y$ is the muted PDSCH RE at antenna port y; k is 0 or 1; y is 0 to 3; $m_y$ is 0 or 1; j=1, 2, ... N. The parameter k takes the values of either 0 or 1 for any transmission antenna port y. The values of $m_y$ for antenna port y depend on which OFDM symbol is configured for PDSCH muting. These are further defined below.

In a second embodiment eNodeB performs rate-matching around its muted PDSCH RE locations on a set of inter-cell CRS pilot locations. These are known to the advanced UE benefiting from CoMP operation. There is no performance degradation as seen at the advanced UE arising from the PDSCH RE muting procedure.

A third embodiment uses PDSCH muting on inter-cell CRS in any PDSCH muting enabled sub-frame. This occurs across the entire bandwidth on OFDM symbols in which PDSCH muting occurs. Within a muting enabled sub-frame, the relative location of muted PDSCH REs (within a given RB) shall stay the same from one RB to the next. The CoMP cells may choose to vary the relative location of their muted PDSCH REs within a PRB across different muting enabled sub-frames.

Figure 3:
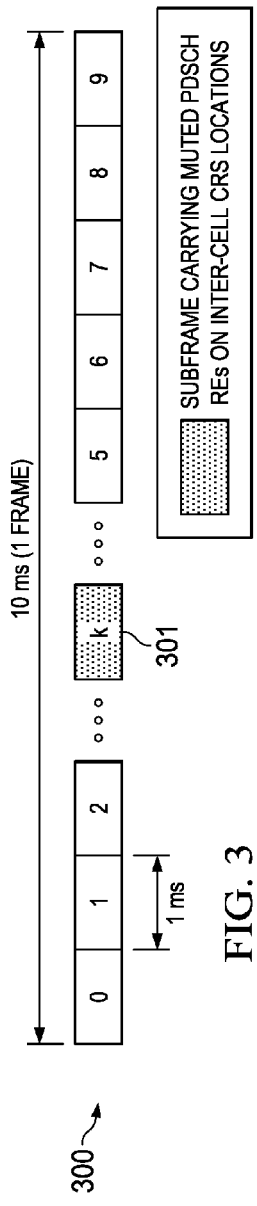
FIG. 3 illustrates an example of the duty cycle of subframes with Physical Downlink Shared CHannel (PDSCH) muting on inter-cell cell-specific reference symbols (CRS)

This application assumes the duty cycle of sub-frames with PDSCH muting on inter-cell CRS equals d mS/frame. The serving eNodeB (Cell 0) performs PDSCH muting every d milliseconds per frame. These sub-frames on which PDSCH muting occurs are called PDSCH muting-enabled sub-frames. FIG. 3 illustrates an example. Frame 300 consists of 10 mS. Sub-frame k 301 occurs once per frame 300. The length of sub-frame k 301 is 1 mS. The duty cycle (time domain periodicity) of PDSCH muting enabled sub-frames equals 10 ms.

Figure 4:
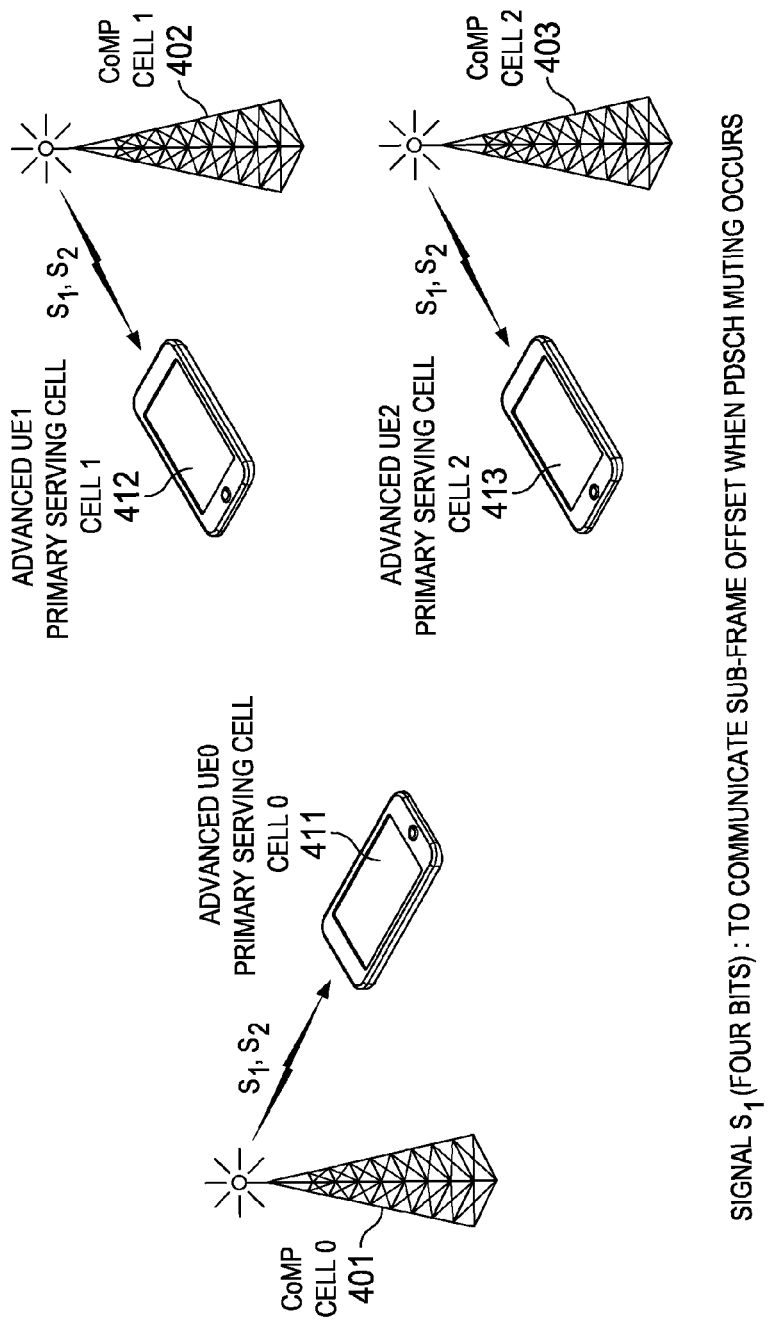
FIG. 4 illustrates a typical transmit scenario.

FIG. 4 illustrates a typical transmit scenario. Serving eNodeB transmit signals specifying inter-cell PDSCH muting sub-frame offset and time domain periodicity. FIG. 4 illustrates three CoMP cells 401, 402 and 403. Each of the three CoMP cells 401, 402 and 403 is the primary serving cell of an advanced UE. Advanced UE0 411 is primarily served by CoMP cell 401. Advanced UE0 412 is primarily served by CoMP cell 402. Advanced UE0 413 is primarily served by CoMP cell 403. The CoMP cells perform CoMP operation and improve coverage to the three advanced UEs.

In a fourth embodiment eNodeBs transmit two signals to the advanced UE. The first signal is labeled $S_1$ in FIG. 4. $S_1$ is four bits which communicate the sub-frame offset on which PDSCH muting for inter-cell CSI estimation occurs. This marks values between 0 through 9. The second signal is labeled $S_2$ in FIG. 4. $S_2$ is two bits which communicate the time domain periodicity of PDSCH muting enabled sub-frames. Both signals $S_1$ and $S_2$ are communicated via semi-static signaling on the PDSCH of the advanced UE. Both signals $S_1$ and $S_2$ are cell-specific (broadcast to UEs served by that cell) to all cells within a CoMP set.

In an alternative to the fourth embodiment noted above, the eNodeB jointly encodes $S_1$ and $S_2$ and send a single signal S transmitting the PDSCH muting on CRS pilot information given by the sub-frame offset and time domain periodicity.

In the fourth embodiment and its alternative the sub-frame offset and time domain periodicity signals are cell-specific to all cells in a CoMP set. These signals are specific to advanced UEs served by cells within the CoMP set. Non-advanced UEs which do not have CoMP reception/inter-cell CSI estimation capability treat these signals as RESERVED. Such non-advanced UEs do not decode or interpret these signals.

In a fifth embodiment for any PDSCH enabled sub-frame, the eNodeB may perform PDSCH muting on REs within a given PRB according to a frequency-hopping pattern. The frequency hopping pattern determines which value of k is chosen. The rest of this application assumes that k=0 and that no frequency hopping is performed.

In a sixth embodiment the density of muted PDSCH REs equals m*N REs/RB/transmit antenna port, where: m is the number of muted PDSCH REs per antenna port in each RB; and N is the number of coordinating secondary cells. The rest of this application assumes that m=1 RE/PRB/port.

A seventh embodiment employs PDSCH muting on the inter-cell CRS for all cells within the CoMP set occurs within identical OFDM symbols and within identical muting enabled sub-frames.

The following examples assume the PDSCH muting occurs according to the first through sixth embodiments above. The description below is of exemplary schemes for determining which OFDM symbol is configured for PDSCH muting on inter-cell CRS REs on PDSCH muting enabled sub-frames. In any sub-frame, OFDM symbols are indexed starting from symbol 0 until symbol 13.

In a first example PDSCH muting on Ports 0 and 1 shall occur on OFDM symbol 0 in any PDSCH muting enabled sub-frame. The term $m_y$ is chosen as y modulo 2 for antenna ports y. Alternately PDSCH muting on Ports 2 and 3 shall occur on OFDM symbol 1 in any PDSCH muting enabled sub-frame.

In a second example PDSCH muting on Ports 0 and 1 shall occur on OFDM symbol 0 in any PDSCH muting enabled sub-frame. The term $m_y$ is chosen as y modulo 2 for port y=0 or 1. For port y=2 and 3, $m_y$ is chosen as 1-y modulo 2. Alternately PDSCH muting on Ports 2 and 3 shall occur on OFDM symbol 8 in any PDSCH muting enabled sub-frame.

In a third example PDSCH muting on Ports 0 and 1 shall occur on OFDM symbol 0 in any PDSCH muting enabled sub-frame. The term $m_y$ is chosen as y modulo 2 for port y=0 or 1. For port y=2 and 3, $m_y$ is chosen as 1-y modulo 2. Alternately PDSCH muting on Ports 2 and 3 shall occur on OFDM symbol 8 in any PDSCH muting enabled sub-frame.

In a fourth example PDSCH muting on Ports 0 and 1 shall occur on OFDM symbol 3 in any PDSCH muting enabled sub-frame. The term $m_y$ is chosen as 1-y modulo 2 for port y=0 or 1. For port y=2 and 3, $m_y$ is chosen as 1-y modulo 2. Alternately PDSCH muting on Ports 2 and 3 shall occur on OFDM symbol 8 in any PDSCH muting enabled sub-frame.

In a fifth example PDSCH muting on Ports 0 and 1 shall occur on OFDM symbol 7 in any PDSCH muting enabled sub-frame. The term $m_y$ is chosen as y modulo 2 for all antenna ports. Alternately PDSCH muting on Ports 2 and 3 shall occur on OFDM symbol 7.

In a sixth example PDSCH muting on Ports 0 and 1 shall occur on OFDM symbol 7 in any PDSCH muting enabled sub-frame. The term $m_y$ is chosen as y modulo 2 for port y=0 or 1. For port y=2 and 3, $m_y$ is chosen as 1-y modulo 2. Alternately PDSCH muting on Ports 2 and 3 shall occur on OFDM symbol 8 in any PDSCH muting enabled sub-frame.

In a seventh example PDSCH muting on Ports 0 and 1 shall occur on OFDM symbol 11 in any PDSCH muting enabled sub-frame. The term $m_y$ is chosen as 1-y modulo 2 for port y=0 or 1. For port y=2 and 3, $m_y$ is chosen as y modulo 2. Alternately PDSCH muting on Ports 2 and 3 shall occur on OFDM symbol 1 in any PDSCH muting enabled sub-frame.

In an eighth example PDSCH muting on Ports 0 and 1 shall occur on OFDM symbol 11 in any PDSCH muting enabled sub-frame. The term $m_y$ is chosen as 1-y modulo 2 for all antenna ports. Alternately PDSCH muting on Ports 2 and 3 shall occur on OFDM symbol 8 in any PDSCH muting enabled sub-frame.

In a ninth embodiment for any muting enabled sub-frame, PDSCH muting on inter-cell CRS locations may be time-hopped according to a pre-determined time-hopping sequence. This time-hopping sequence is known to the advanced UE. These time-hopping sequences are a subset chosen according to one or more of the examples above.

Figure 5:
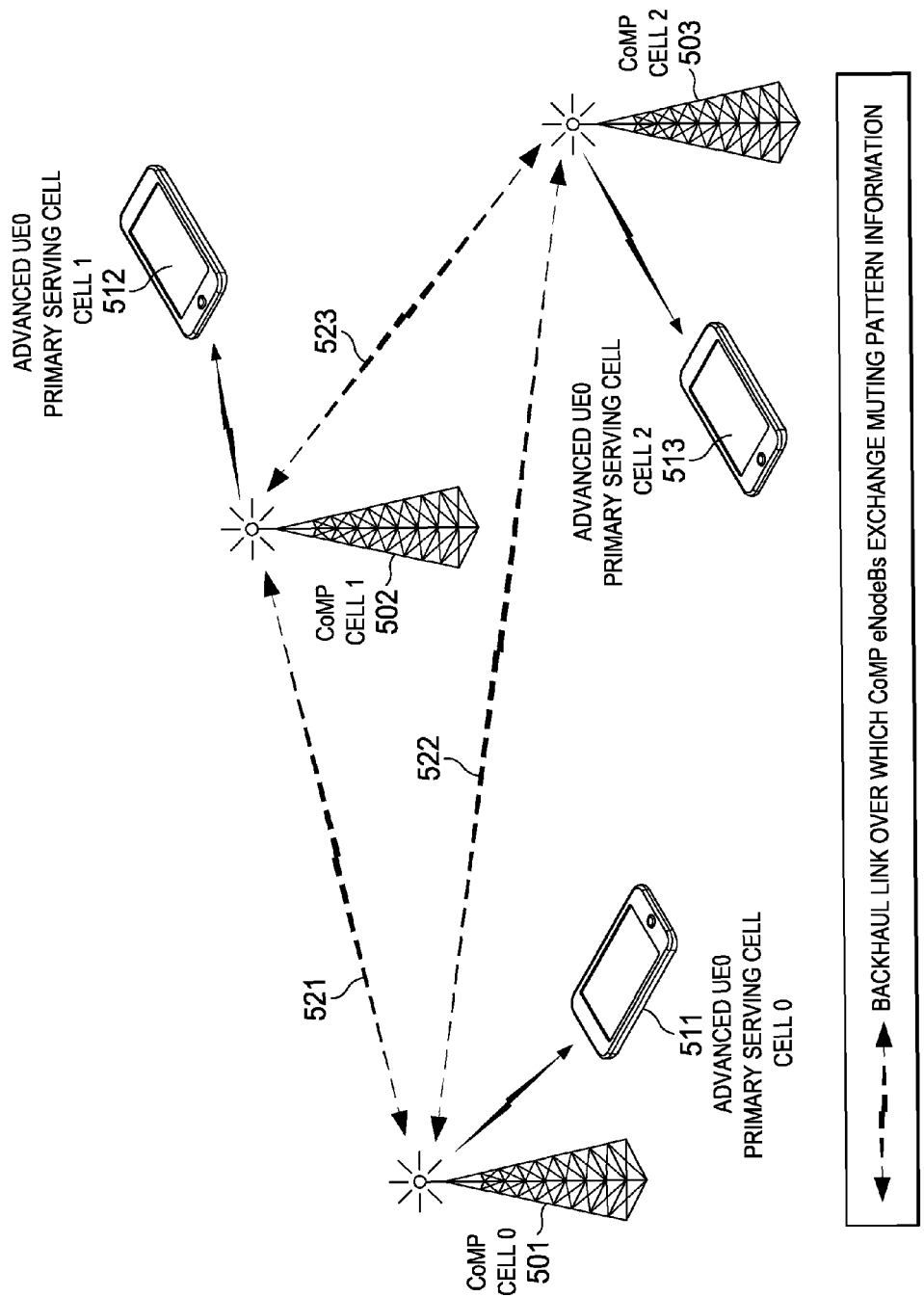
FIG. 5 illustrates three Coordinated Multipoint Reception (CoMP) cells operating as primary serving cells of respective user equipments 511, 512 and 513.

In a tenth embodiment all cells belonging to the CoMP set exchange muting pattern information such as the location of their CRS port i ($0 \leq i \leq 3$) on the resource block grid. FIG. 5 illustrates this scenario. FIG. 5 illustrates three CoMP cells 501, 502 and 503. Each of the three CoMP cells 501, 502 and 503 is the primary serving cell of an advanced UE. Advanced UE0 511 is primarily served by CoMP cell 501. Advanced UE0 512 is primarily served by CoMP cell 502. Advanced UE0 513 is primarily served by CoMP cell 503. The three CoMP cells 501, 502 and 503 exchange muting patterns backhaul links 521, 522 and 523 connecting eNodeBs. Each cell may convey its cell ID to a cooperating cell, so that the cooperating cell can infer the location of the CRS ports of the cooperating cell using a cell ID modulo 6 operation.

Assume for sample PDSCH muting patterns according to the first embodiment of this invention that that the serving cell (CoMP cell 0) has a cell ID equal to 0 modulo 6. Such a cell ID could be 432. Further assume that first other CoMP cell has a cell ID equal to 4 modulo 6 such as 430 and the second other CoMP cell has a cell ID equal to 5 modulo 6 such as 431. FIGS. 6 to 9 illustrate PDSCH muting patterns on inter-cell CRS for an eNodeB with a cell ID equal to 0 modulo 6 having four antenna transmission ports. The PDSCH muting on inter-cell CRS locations is assumed to occur with a frequency domain periodicity of N REs/PRB/port. N is the number of CoMP cells excluding the serving eNodeB and assumed to be 2. Further assume that all CoMP cells including serving cell 0 have the same number of transmission antenna ports.

In FIGS. 6 to 11: $R_i$ is the element corresponding to intra-cell CRS on antenna transmission port i; $R_{ij}$ is the element corresponding to inter-cell CRS on antenna transmission port i transmitted from CoMP cell j; i cannot exceed the number of transmission antennas in the serving cell; and j cannot exceed the total number of CoMP cells (N). Muted PDSCH REs on inter-cell RE locations are shown by light light gray and dark dark gray.

Figure 6:
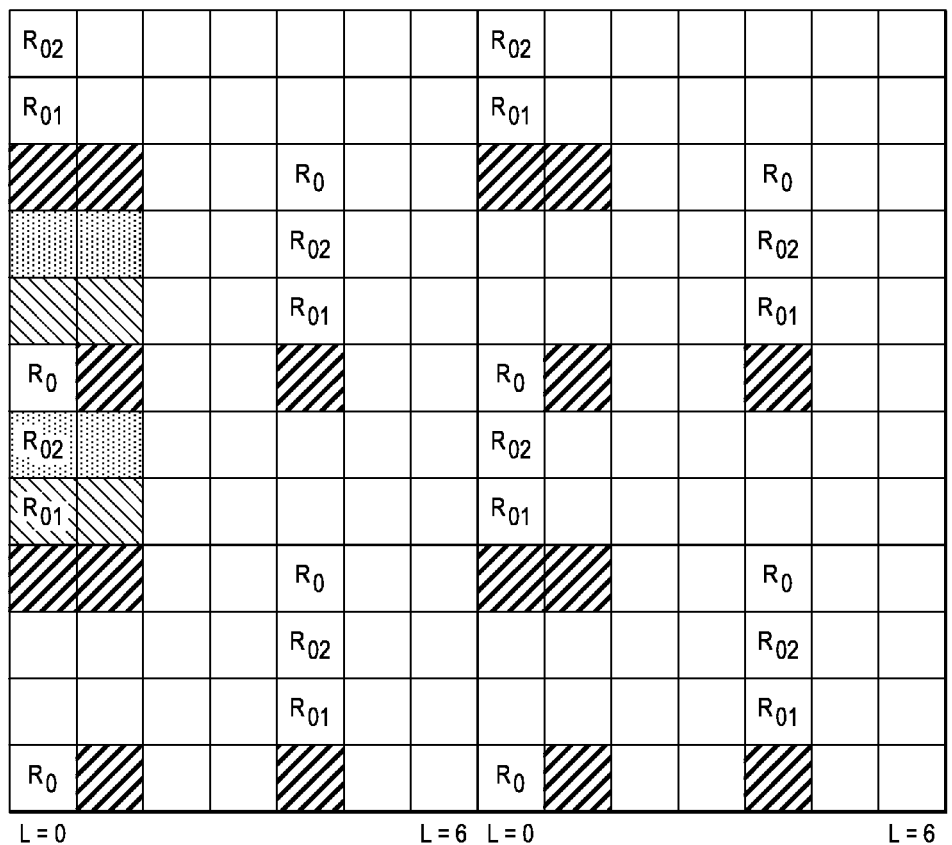
FIG. 6 illustrates the PDSCH muting pattern for transmission antenna port 0 of four antenna ports.

FIG. 6 illustrates the PDSCH muting pattern for transmission antenna port 0 of four antenna ports.

Figure 7:
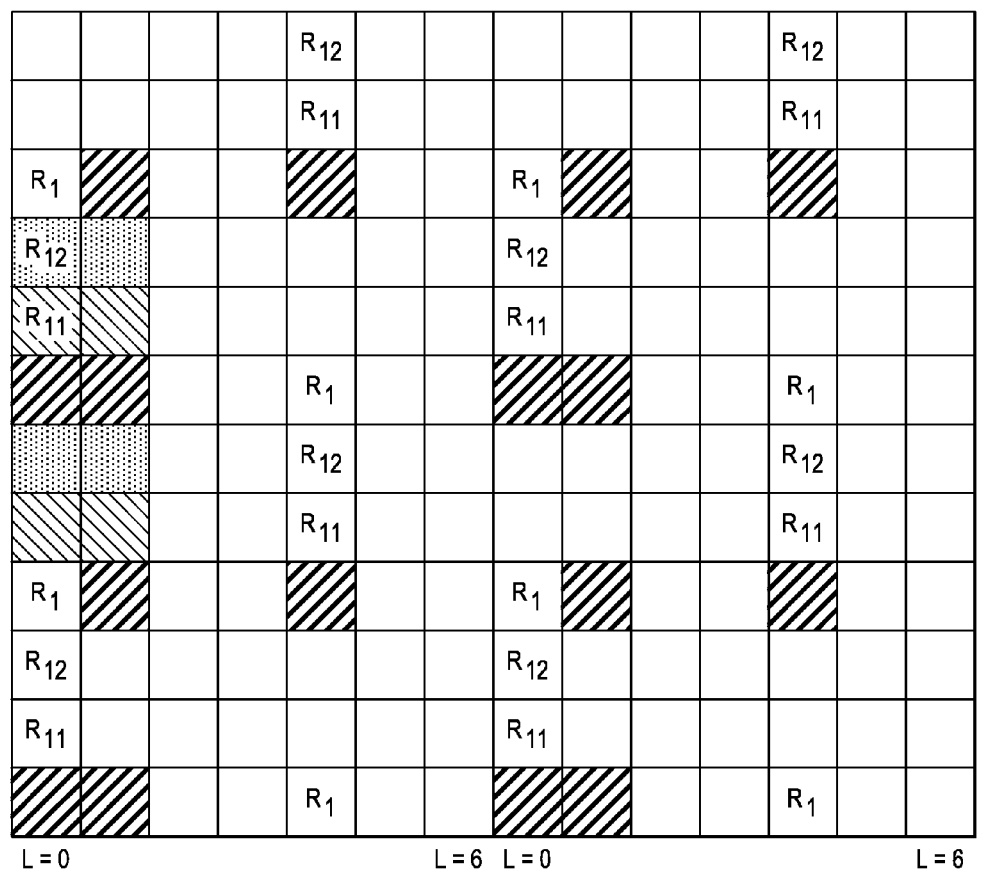
FIG. 7 illustrates the PDSCH muting pattern for transmission antenna port 1 of four antenna ports.

FIG. 7 illustrates the PDSCH muting pattern for transmission antenna port 1 of four antenna ports.

Figure 8:
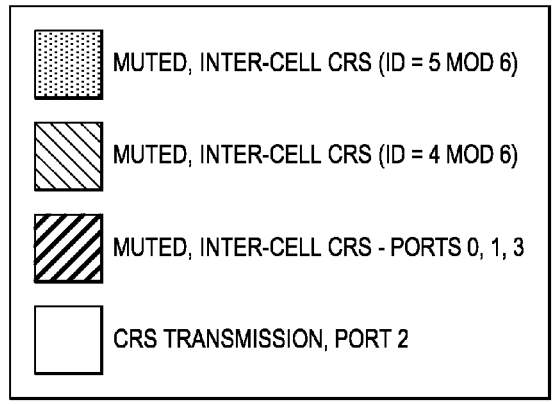
FIG. 8 illustrates the PDSCH muting pattern for transmission antenna port 2 of four transmit ports.
Figure 8:
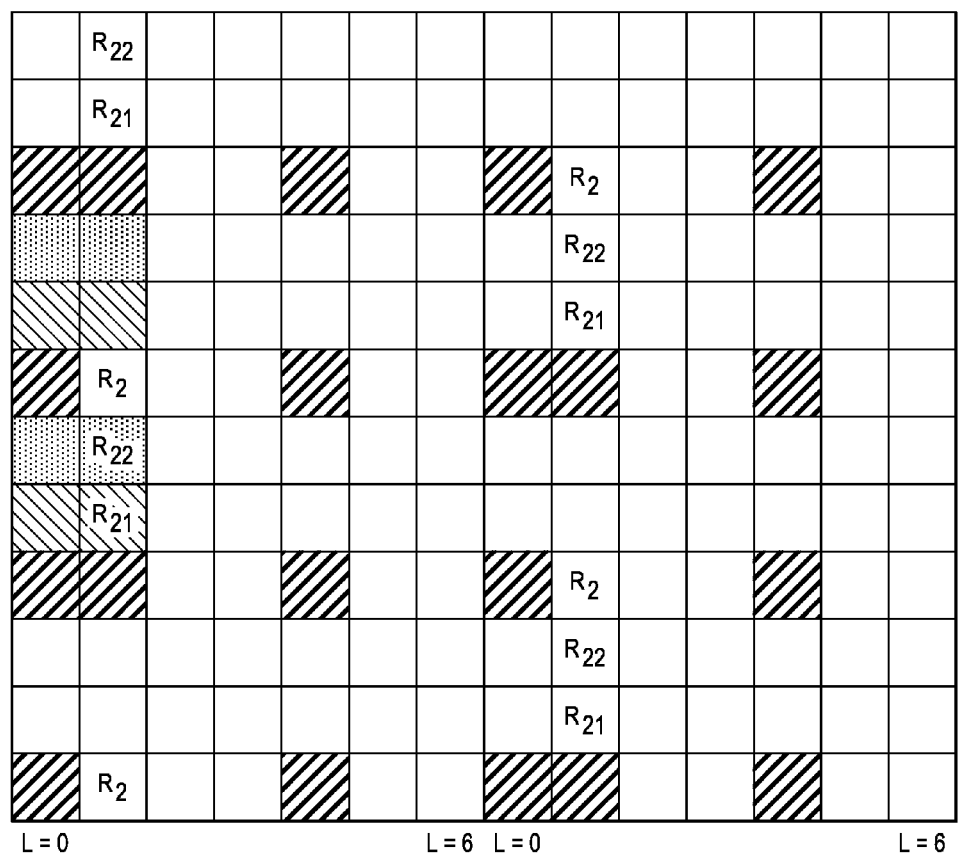

FIG. 8 illustrates the PDSCH muting pattern for transmission antenna port 2 of four transmit ports.

Figure 9:
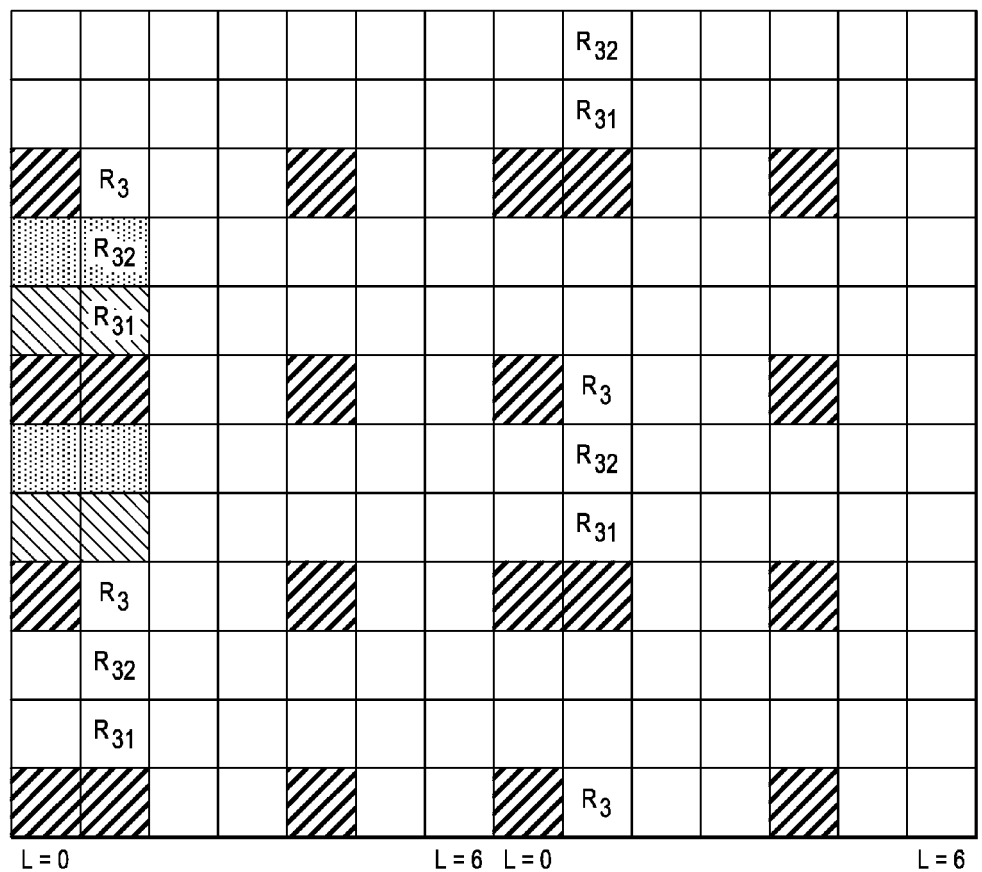
FIG. 9 illustrates the PDSCH muting pattern for transmission antenna port 3 of four transmit ports.

FIG. 9 illustrates the PDSCH muting pattern for transmission antenna port 3 of four transmit ports.

Figure 10:
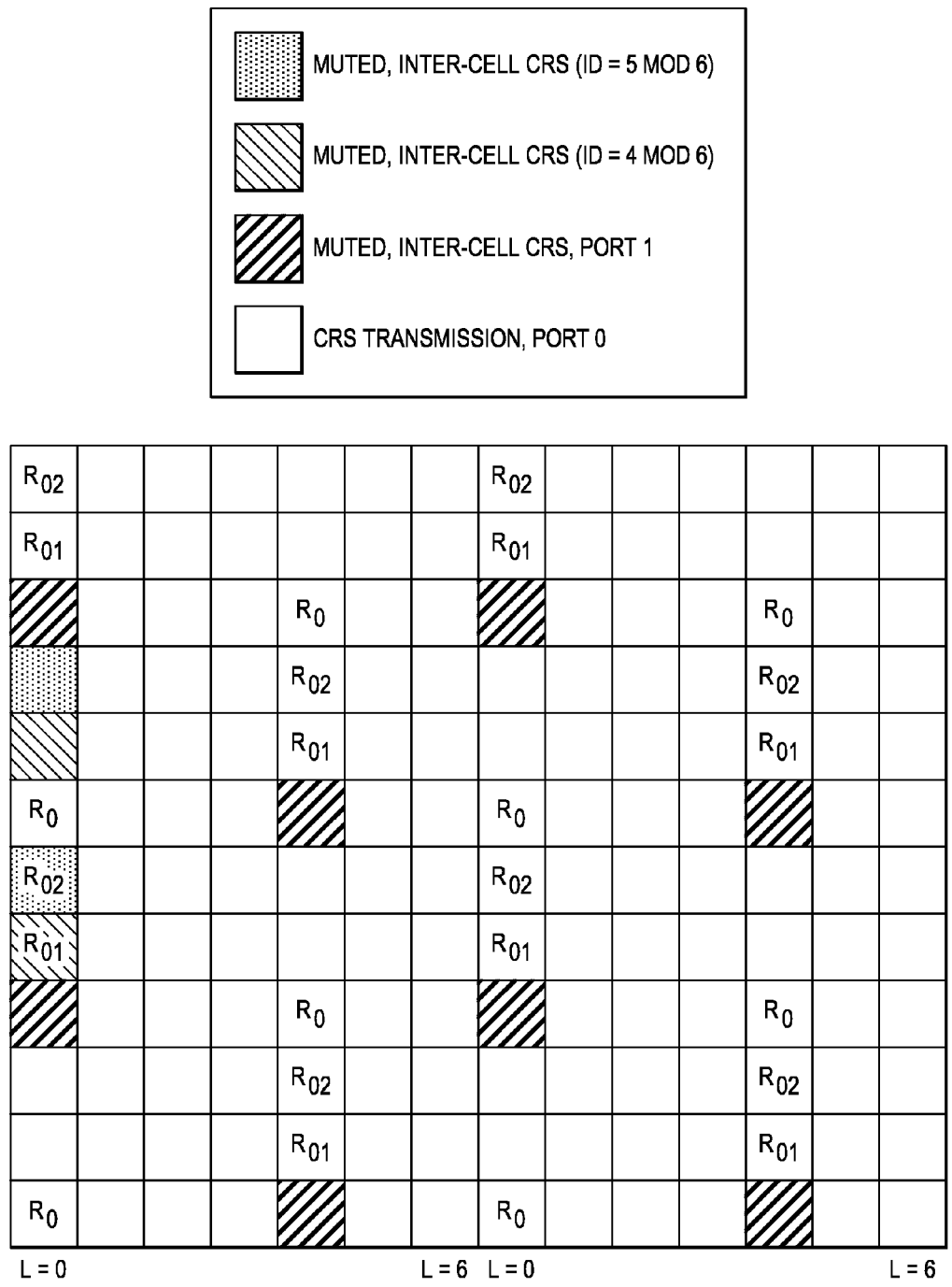
FIG. 10 illustrates the PDSCH muting pattern for transmission antenna port 0 of two transmit ports.
Figure 11:
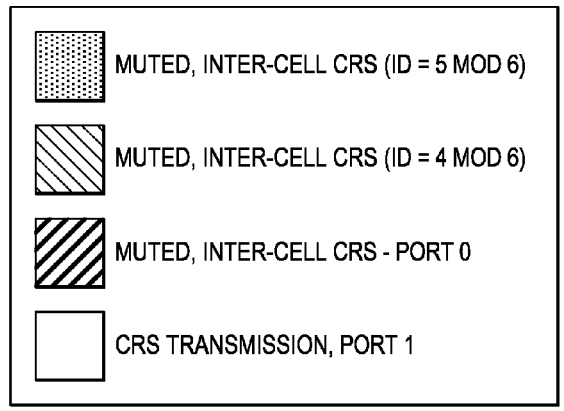
FIG. 11 illustrates the PDSCH muting pattern for transmission antenna port 1 of two transmit ports.
Figure 11:
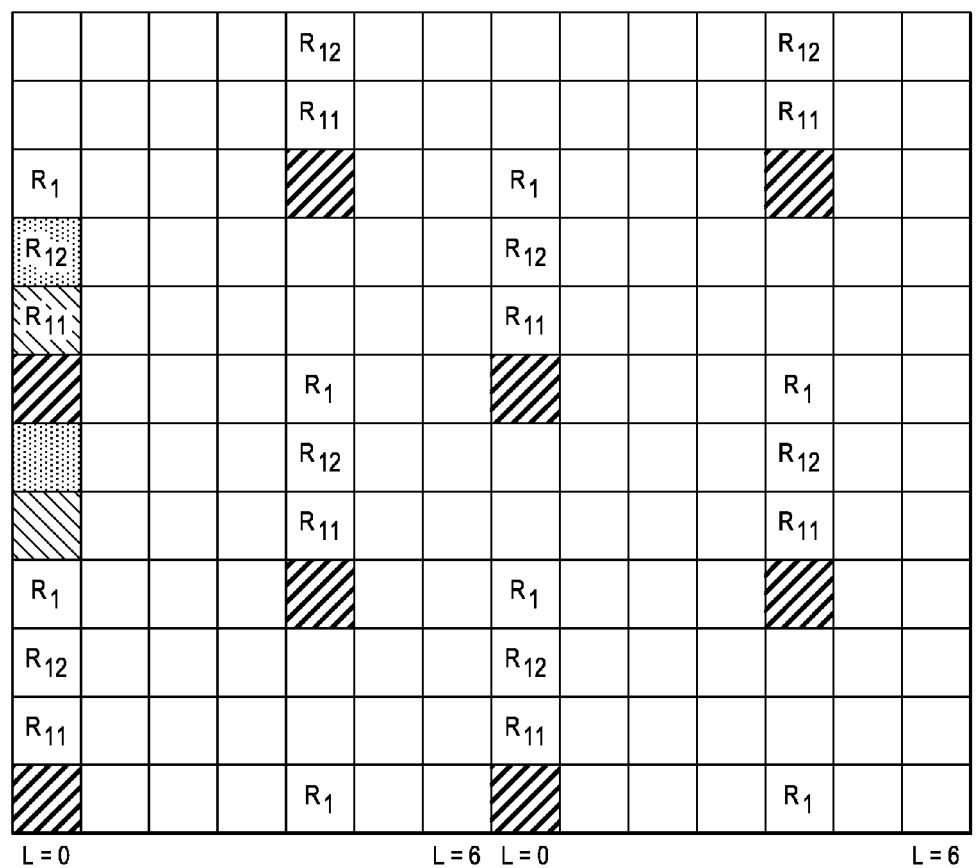

FIGS. 10 and 11 illustrate corresponding muting patterns for such an eNodeB equipped with two antenna transmission ports.

FIG. 10 illustrates the PDSCH muting pattern for transmission antenna port 0 of two transmit ports.

FIG. 11 illustrates the PDSCH muting pattern for transmission antenna port 1 of two transmit ports.

It is straight forward to obtain similar muting patterns for the second through eighth examples above. It is also straight forward to obtain muting patterns for cell IDs equaling 1 and 2 modulo 6.

Figure 12:
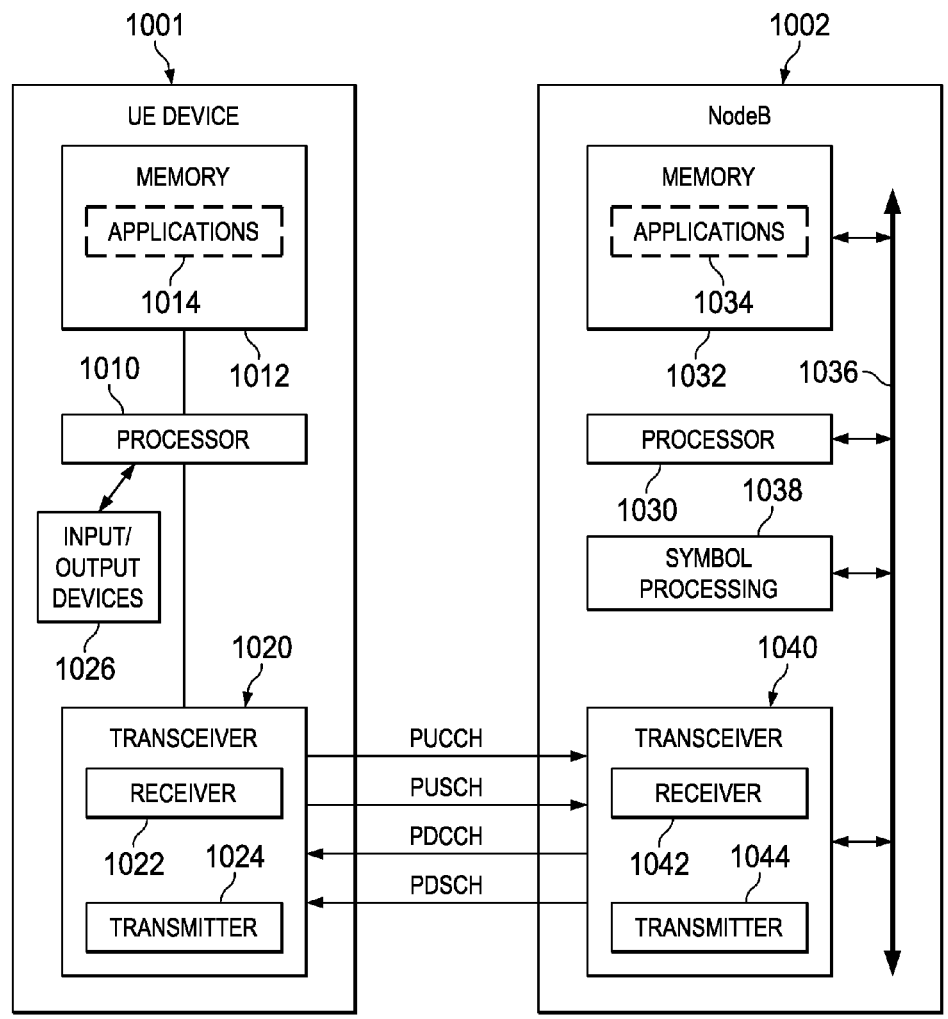
FIG. 12 is a block diagram illustrating internal details of a base station and a mobile user equipment in the network system of FIG. 1 suitable for implementing this invention.

FIG. 12 is a block diagram illustrating internal details of an eNB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with eNB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VoIP) tools, file browsers, firewalls, instant messaging, finance tools, games, word processors or other categories. Regardless of the exact nature of the applications, at least some of the applications may direct the mobile UE 1001 to transmit UL signals to eNB (base-station) 1002 periodically or continuously via the transceiver 1020. In at least some embodiments, the mobile UE 1001 identifies a Quality of Service (QoS) requirement when requesting an uplink resource from eNB 1002. In some cases, the QoS requirement may be implicitly derived by eNB 1002 from the type of traffic supported by the mobile UE 1001. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 1012 by processor 1010. In other embodiments, the message size determination may be embodied by a separate processor/memory unit, by a hardwired state machine, or by other types of control logic, for example.

eNB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct eNB 1002 to manage transmissions to or from mobile UE 1001.

Transceiver 1040 comprises an uplink Resource Manager, which enables eNB 1002 to selectively allocate uplink Physical Uplink Shared CHannel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of eNB 1002 and at least one transmitter 1044 for transmitting data and control information to the various UEs within range of eNB 1002.

The uplink resource manager executes instructions that control the operation of transceiver 1040. Some of these instructions may be located in memory 1032 and executed when needed on processor 1030. The resource manager controls the transmission resources allocated to each UE 1001 served by eNB 1002 and broadcasts control information via the PDCCH.

Symbol processing circuitry 1038 performs demodulation using known techniques. Random access signals are demodulated in symbol processing circuitry 1038.

During transmission and reception of voice data or other application data, receiver 1042 may receive a random access signal from a UE 1001. The random access signal is encoded to request a message size that is preferred by UE 1001. UE 1001 determines the preferred message size by using a message threshold provided by eNB 1002. In this embodiment, the message threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message threshold is a fixed value that may be stored in memory 1032, for example. In response to receiving the message size request, eNB 1002 schedules an appropriate set of resources and notifies UE 1001 with a resource grant.

What is claimed is:

1. A method of inter-cell channel quality information (CSI) estimation in a wireless telephony system having plural base stations each having plural antenna ports and plural mobile user equipment, each mobile user equipment having a primary serving base station, at least one mobile user equipment having a Coordinated Multipoint Reception relationship to a base station not its primary servicing base station, the method comprising:

transmitting to the at least one user equipment on its Physical Downlink Shared CHannel (PDSCH) from the corresponding primary serving base station a mute PDSCH having zero energy on a resource element (RE) location of each non-serving base station, the muted PDSCH RE positions on cell-specific reference symbol (CRS) locations of each transmission antenna port from the primary serving base station given as:

$$M_y = \{6*k + [3*m_y + \text{CellID}(\text{CoMP Cell}_j)\text{modulo}6]\} \text{modulo}12$$

where: $M_y$ is the muted PDSCH RE at antenna port y; k is 0 or 1, where k takes the values of either 0 or 1 for any transmission antenna port y; y is index number of the selected antenna port; $m_y$ is an integer, where $m_y$ takes a value dependent upon which Orthogonal Frequency Division Multiplexing (OFDM) symbol is configured for PDSCH muting; j=1, 2, ... N, where N is a number of base stations having a Coordinated Multipoint Reception relationship to the at least one user equipment and j does not equal the cell ID of the primary servicing base station;
performing rate-matching at the primary servicing base station of its PDSCH around the inter-cell CSR pilot locations of the muted PDSCH; and
the at least one user equipment performing inter-cell CSI estimation with respect to a selected base station having a Coordinated Multipoint Reception relationship to the at least one user equipment.

2. The method of claim 1, wherein:
transmitting PDSCH muting on inter-cell CRS in any PDSCH muting enabled sub-frame across the entire bandwidth on OFDM symbols in which PDSCH muting occurs.

3. The method of claim 2, wherein:
transmitting the muted PDSCH REs having a relative location within a given Resource Block (RB) for every RB.

4. The method of claim 3, wherein:
transmitting the muted PDSCH REs within a Physical Resource Block (PRB) across different muting enabled sub-frames from all base stations having a Coordinated Multipoint Reception relationship to the at least one user equipment.

5. The method of claim 1, further comprising the step of:
periodically transmitting to the at least one user equipment from the primary serving base station of the user equipment signals specifying inter-cell PDSCH muting sub-frame offset and time domain periodicity.

6. The method of claim 5, wherein:
periodically transmitting signals specifying inter-cell PDSCH muting sub-frame offset and time domain periodicity transmits via semi-static signaling on the PDSCH of the at least one user equipment cell-specific first and second signals wherein
the first signal has four bits identifying a sub-frame offset on which PDSCH muting for inter-cell CSI estimation occurs, and
the second signal has two bits identifying a time domain periodicity of PDSCH muting enabled sub-frames.

7. The method of claim 5, wherein:
periodically transmitting signals specifying inter-cell PDSCH muting sub-frame offset and time domain periodicity transmits via semi-static signaling on the PDSCH of the at least one user equipment cell-specific a jointly coded signal consisting of
a first portion having four bits identifying a sub-frame offset on which PDSCH muting for inter-cell CSI estimation occurs, and
a second portion having two bits identifying a time domain periodicity of PDSCH muting enabled sub-frames.

8. The method of claim 1, wherein:
transmitting muted PDSCHs for any PDSCH enabled sub-frame within a given PRB according to a frequency-hopping pattern.

9. The method of claim 8, wherein:
frequency-hopping pattern determines a value of k.

10. The method of claim 1, wherein:
transmitting muted PDSCHs having a density of muted PDSCH REs equals m*N REs per RB transmit antenna port, where: m is the number of muted PDSCH REs per antenna port in each RB; and N is the number of coordinating secondary cells.

11. The method of claim 1, wherein:
transmitting muted PDSCHs on an inter-cell CRS for all cells within a CoMP set on identical OFDM symbols and within identical muting enabled sub-frames.

12. The method of claim 1, wherein:
transmitting muted PDSCHs on Ports 0 and 1 on OFDM symbol 0 in any PDSCH muting enabled sub-frame, and $m_y$ is chosen as y modulo 2 for antenna ports y.

13. The method of claim 1, wherein:
transmitting muted PDSCHs on Ports 2 and 3 on OFDM symbol 1 in any PDSCH muting enabled sub-frame, and $m_y$ is chosen as y modulo 2 for antenna ports y.

14. The method of claim 1, wherein:
transmitting muted PDSCHs on Ports 0 and 1 on OFDM symbol 0 in any PDSCH muting enabled sub-frame, and $m_y$ is chosen as y modulo 2 for port y=0 or 1 and 1-y modulo 2 for port y=2 and 3.

15. The method of claim 1, wherein:
transmitting muted PDSCHs on Ports 2 and 4 on OFDM symbol 8 in any PDSCH muting enabled sub-frame, and $m_y$ is chosen as y modulo 2 for port y=0 or 1 and 1-y modulo 2 for port y=2 and 3.

16. The method of claim 1, wherein:
transmitting muted PDSCHs on Ports 0 and 1 on OFDM symbol 0 in any PDSCH muting enabled sub-frame, and $m_y$ is chosen as y modulo 2 for port y=0 or 1 and 1-y modulo 2 for port y=2 and 3.

17. The method of claim 1, wherein:
transmitting muted PDSCHs on Ports 2 and 3 on OFDM symbol 8 in any PDSCH muting enabled sub-frame, and $m_y$ is chosen as y modulo 2 for port y=0 or 1 and 1-y modulo 2 for port y=2 and 3.

18. The method of claim 1, wherein:
transmitting muted PDSCHs on Ports 0 and 1 on OFDM symbol 3 in any PDSCH muting enabled sub-frame, and $m_y$ is chosen as 1-y modulo 2 for port y=0 or 1 and 1-y modulo 2 for port y=2 and 3.

19. The method of claim 1, wherein:
transmitting muted PDSCHs on Ports 2 and 3 on OFDM symbol 8 in any PDSCH muting enabled sub-frame, and $m_y$ is chosen as 1-y modulo 2 for port y=0 or 1 and 1-y modulo 2 for port y=2 and 3.

20. The method of claim 1, wherein:
transmitting muted PDSCHs on Ports 0 and 1 on OFDM symbol 7 in any PDSCH muting enabled sub-frame, and $m_y$ is chosen as y modulo 2 for all antenna ports.

21. The method of claim 1, wherein:
transmitting muted PDSCHs on Ports 2 and 3 on OFDM symbol 7 in any PDSCH muting enabled sub-frame, and $m_y$ is chosen as y modulo 2 for all antenna ports.

22. The method of claim 1, wherein:
transmitting muted PDSCHs on Ports 0 and 1 on OFDM symbol 7 in any PDSCH muting enabled sub-frame, and $m_y$ is chosen as y modulo 2 for port y=0 or 1 and as 1-y modulo 2 for port y=2 and 3.

23. The method of claim 1, wherein:
transmitting muted PDSCHs on Ports 2 and 31 on OFDM symbol 8 in any PDSCH muting enabled sub-frame, and $m_y$ is chosen as y modulo 2 for port y=0 or 1 and as 1-y modulo 2 for port y=2 and 3.

24. The method of claim 1, wherein:
transmitting muted PDSCHs on Ports 0 and 1 on OFDM symbol 11 in any PDSCH muting enabled sub-frame, and $m_y$ is chosen as 1-y modulo 2 for port y=0 or 1 and as y modulo 2 for port y=2 and 3.

25. The method of claim 1, wherein:
transmitting muted PDSCHs on Ports 2 and 3 on OFDM symbol 1 in any PDSCH muting enabled sub-frame, and $m_y$ is chosen as 1-y modulo 2 for port y=0 or 1 and as y modulo 2 for port y=2 and 3.

26. The method of claim 1, wherein:
transmitting muted PDSCHs on Ports 0 and 1 on OFDM symbol 11 in any PDSCH muting enabled sub-frame, and term $m_y$ is chosen as 1-y modulo 2 for all antenna ports.

27. The method of claim 1, wherein:
transmitting muted PDSCHs on Ports 2 and 3 on OFDM symbol 8 in any PDSCH muting enabled sub-frame, and term $m_y$ is chosen as 1-y modulo 2 for all antenna ports.

28. The method of claim 1, wherein:
transmitting muted PDSCHs any PDSCH enabled sub-frame on inter-cell CRS locations according to a predetermined time-hopping sequence known to the at least one user equipment.

29. The method of claim 1, further comprising the step of:
said primary base station and each base station having a Coordinated Multipoint Reception relationship to the at least one user equipment exchanging muting pattern information on a resource block grid enabling each such cell to infer a location of each other such cell.

30. The method of claim 29, wherein:
muting pattern information includes their cell ID.

31. The method of claim 29, wherein:
muting pattern information includes the location of their CRS port i where $0 \leq i \leq 3$.

32. The method of claim 29, wherein:
resource block grid includes a backhaul link.

* * * * *